United States Patent [19]
Haerle

[11] Patent Number: 5,266,279
[45] Date of Patent: Nov. 30, 1993

[54] FILTER OR CATALYST BODY

[75] Inventor: Hans A. Haerle, Bopfingen, Fed. Rep. of Germany

[73] Assignee: Schwaebische Huettenwerke GmbH, Fed. Rep. of Germany

[21] Appl. No.: 853,945

[22] Filed: Mar. 19, 1992

[30] Foreign Application Priority Data

Mar. 28, 1991 [DE] Fed. Rep. of Germany ....... 4110285

[51] Int. Cl.$^5$ .......................... F01N 3/02; B01D 53/34
[52] U.S. Cl. .................................... 422/177; 422/180;
55/523; 55/525; 502/439; 502/527
[58] Field of Search ........................ 422/168, 177, 180;
55/523, 524, 525, DIG. 30; 502/439, 527

[56] References Cited

U.S. PATENT DOCUMENTS

| | | | |
|---|---|---|---|
| 2,267,918 | 12/1941 | Hildabolt | 29/189 |
| 3,087,233 | 4/1963 | Turnbull | 29/182 |
| 3,161,478 | 12/1964 | Chessin | 29/191.2 |
| 3,306,353 | 2/1967 | Burne | 165/164 |
| 3,810,732 | 5/1974 | Koch | 431/7 |
| 3,904,551 | 9/1975 | Lundsager et al. | 252/455 R |
| 3,956,192 | 5/1976 | Nicolai | 252/477 R |
| 4,064,914 | 12/1977 | Grant | 138/142 |
| 4,220,625 | 9/1980 | Toh et al. | 422/180 |
| 4,301,012 | 11/1981 | Puckett | 210/457 |
| 4,329,162 | 5/1982 | Pitcher, Jr. | 55/523 |
| 4,515,758 | 5/1985 | Domesle et al. | 423/213.2 |
| 4,652,286 | 3/1987 | Kusuda et al. | 55/523 |
| 4,662,915 | 5/1987 | Shirai et al. | 55/511 |
| 4,687,579 | 8/1987 | Bergman | 210/347 |
| 4,699,637 | 10/1987 | Iniotakis et al. | 55/525 |
| 4,725,411 | 2/1988 | Cornelison | 422/180 |
| 4,732,593 | 3/1988 | Kondo et al. | 55/523 |
| 4,758,272 | 7/1988 | Pierotti et al. | 75/246 |
| 4,760,047 | 7/1988 | Jeschke et al. | 502/439 |
| 4,889,630 | 12/1989 | Reinhardt et al. | 210/490 |
| 4,960,449 | 10/1990 | Yonushonis | 55/523 |
| 4,971,769 | 11/1990 | Haerle | 422/171 |
| 4,981,172 | 1/1991 | Haerle | 165/133 |
| 4,983,193 | 1/1991 | Tani et al. | 55/487 |
| 5,009,857 | 4/1991 | Haerle | 422/180 |
| 5,035,875 | 7/1991 | Daish | 423/580 |
| 5,059,326 | 10/1991 | Haerle | 210/491 |

Primary Examiner—James C. Housel
Assistant Examiner—Jeffrey R. Snay
Attorney, Agent, or Firm—Welsh & Katz, Ltd.

[57] ABSTRACT

A filter or catalyst body for removing harmful constituents from the waste gases of an internal combustion engine, especially a diesel engine, is provided with at least one fabric layer of metal wires or metal fibers. Sintering material in the form of powder, granules, fiber fragments or chips is introduced into the meshes and is sintered on to the wires or fibers. The woven fabric is in the form of a twilled wire fabric (1), sintering material (4) being introduced into the meshes (5) thereof and being sintered together with the wires or fibers (2, 3).

15 Claims, 1 Drawing Sheet

FIG. 1
FIG. 3
FIG. 2
FIG. 4
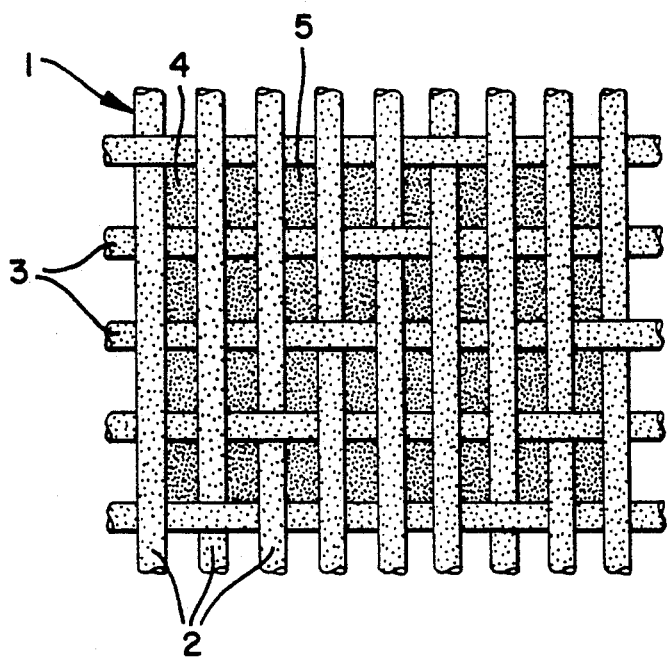
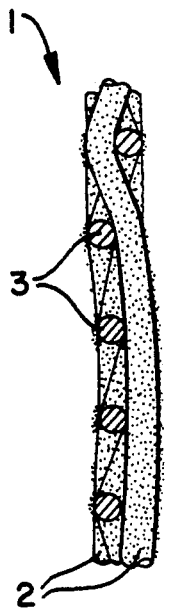
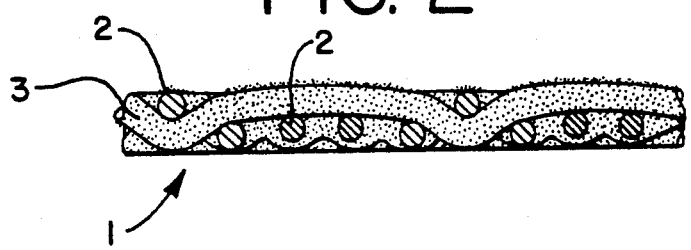
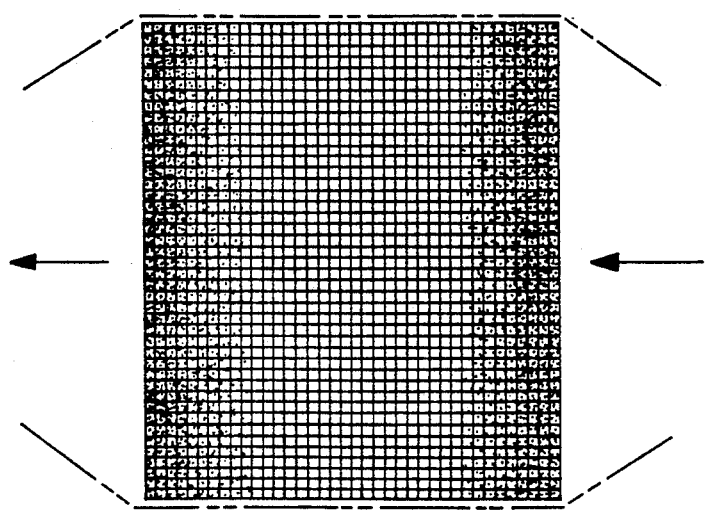

FILTER OR CATALYST BODY

BACKGROUND OF THE INVENTION

The invention relates to a filter or catalyst body for removing harmful constituents from the waste gases of an internal combustion engine, especially a diesel engine, comprising at least one fabric layer of metal wires or metal fibres, sintering material in the form of powder, granules, fibre fragments or chips being introduced into the meshes and being sintered on to the wires or fibres.

A filter or catalyst body of this kind is described, e.g. in DE-A 39 08 581.

In this case, a multilayer woven or knitted fabric is used as the base material, wires or fibres being placed flat on top of one another in several layers.

One main sphere of application of a body of this kind is internal combustion engines in motor vehicles, ecologically harmful and/or noxious constituents such as soot, carbon monoxide, hydrocarbons and nitrogen oxides being removed from the waste gas flow.

However, the economical and practical application of filter or catalyst bodies of this kind has not been possible hitherto as a result of the problems encountered in this sphere.

One disadvantage, e.g. is the fact that filter or catalyst bodies are in themselves relatively inhomogeneous, this being particularly true of an irregularly formed knitted fabric. Similarly, the transmission of heat to the body and the thermal conductivity therein is limited. Therefore, the heat cannot always be dissipated in a uniform manner, and there is a risk of local overheating, so that uniform soot combustion cannot be guaranteed. A further problem with the known filter bodies consists in that they have limited mechanical stability. This would lead to problems when used in the waste gas flow of an internal combustion engine as a result of the rough loading occurring in this connection, especially high temperatures and pressure pulsations, so that filter or catalyst bodies of the type described hereinbefore cannot yet be used economically for this sphere of application.

SUMMARY OF THE INVENTION

Therefore, the object of this invention is to improve a filter or catalyst body of the type described at the outset in such a manner that it is more suitable for the removal of harmful constituents from the waste gases of an internal combustion engine, and in particular displays improved heat distribution and thermal conductivity.

This problem is solved according to the invention in that the woven fabric is in the form of a twilled wire fabric, sintering material being introduced into the meshes thereof and being sintered together with the wires or fibres.

It has been found in a surprising manner that a twilled wire fabric is particularly suitable for the sphere of application provided. In a twill weave, the lifting of the warp in the weft body or the lowering of the warp in the warp body in the repeat of the weave only come into contact in a diagonal. The wires or fibres of the twilled wire fabric are arranged more regularly in the woven fabric and the meshes are very uniform and relatively large. This means that the sintering material can be introduced without difficulty into the individual meshes, giving a substantially homogeneous woven fabric after sintering, so that improved heat transmission to the woven fabric and more uniform thermal conductivity and heat distribution in the woven fabric is achieved. This is particularly advantageous for the application provided in the waste gas flow of an internal combustion engine, where high temperature differences or high temperature deviations appear. Therefore, the woven fabric should be heated as rapidly and as uniformly as possible, especially in cold-start operation, so that it can become effective as a filter or catalyst body as rapidly as possible. Overheating in full-load operation should simultaneously be avoided. This means that rapid and uniform heat distribution or dissipation must be provided for. This is obtained surprisingly well by the woven fabric according to the invention.

A further advantage of the twilled wire fabric consists in the fact that it is lightweight and in the fact that it is possible to use relatively thick wires with relatively small mesh widths.

Compared to a normal woven fabric, the sintering process, in which the sintering material introduced and the wires are joined together at the contact or intersection points, results in significantly improved heat distribution over the contact points in the interior of the woven fabric. The stability thereof is also significantly improved at the same time.

The twilled wire fabric moreover provides a spatial structure in which the sintering material can be embedded in an improved manner. At the same time, the woven fabric thus becomes stiffer and retains its stiffness even at high temperatures.

After the sintering process, the filter or catalyst body can be made without difficulty into the desired final shape, this being adapted to the installation and space requirements.

It has been found in practice that a 4-shaft or 5-shaft twilled wire fabric is most suitable as the starting material. This is particularly true in the case of a 5-shaft twilled wire fabric, only every fifth wire being bound into the warp and weft. As a rule, a wire fabric of this kind is woven as an oblong mesh fabric, for the application provided, the wire thickness advantageously being selected to have the same diameter in the warp and weft directions.

It has been found in practice that a ratio of mesh width to wire diameter of the order of approximately 1:1 is very suitable. A woven fabric of this kind gives high uniformity with respect to temperature distribution and heat dissipation, with simultaneous very rapid heating for cold-start operation.

Values in the region of 0.15–0.30 mm, preferably 0.20 mm, have been found to be the most suitable mesh widths or diameters.

A very advantageous development of the invention consists in that the wires or fibres of the woven fabric are slightly curved in such a manner that the thickness of the woven fabric is approximately 2.5 times the diameter of the wires or fibres of the woven fabric.

This design gives an even better spatial structure for a layer and even more sintering material can be introduced.

Steel wire containing approximately 20% of nickel and 25 % of chromium has proven to be a very suitable material for the wires.

In an advantageous development of the invention, the wires or fibres of the woven fabric can be further provided with catalytically active coating material. Thus, a catalytic material can be applied, e.g. at the feed end to the woven fabric or its wires or fibres, so that, when using the woven fabric as a soot filter, the ignition temperature for soot combustion is reduced. To this end, e.g. iron, manganese, molybdenum, vanadium pentaoxide and the like can be used as the catalytic material.

If it is desired to remove further harmful constituents from the waste gas, e.g. carbon monoxide, nitrogen oxides or hydrocarbons, the woven fabric can advantageously be provided at the delivery end with a corresponding catalyst, e.g. rhodium, platinum, palladium or the like.

According to the invention, the filter or catalyst body can be designed to be single- or multi-layered. In the case of a multi-layered design, several woven fabrics into the meshes of which sintering material has been introduced are generally joined together in a common sintering process.

A further advantageous and non-obvious development of the invention may consist in that the woven fabric is designed with a smooth surface on one side and a rough surface on the other side.

In an advantageous arrangement, the woven fabric can be arranged in such a manner that the rough surface is arranged at the feed end. This results in a large surface for separating or converting the harmful constituents, e.g. soot, while a low counterpressure is produced by the smooth delivery end. The power losses of the internal combustion engine can be kept lower in this manner.

Another advantage of the design with one smooth and one rough surface also consists in that, if desired, this can be controlled in different ways with a multi-layered design of the filter or catalyst body by a corresponding combination of the individual layers with smooth and rough feed and delivery ends with respect to pressure loss or pressure reduction and its filter or catalyst properties.

In this manner, a roughing filter can be provided, e.g. by the use of a woven fabric having a rough exterior.

In a process for the production of the filter or catalyst body according to the invention, it may be provided that the sintering material is introduced into the meshes of a twilled wire fabric via a binder, after which the wires or fibres and the material are sintered together.

In an advantageous method according to the invention, a binder is used in order to introduce the sintering material into the meshes with as uniform a distribution as possible. The binder can act as a filler in which the sintering material is distributed as uniformly as possible. The binder can then be spread, rolled or applied uniformly in an immersion process into the meshes of the woven fabric together with the material distributed therein. The sintering material can also be applied to the top and bottom of the wires or fibres in order to increase the heat transfer.

It should simply be noted in this connection that a binder which evaporates or vaporises in the subsequent sintering process without leaving a residue is used.

Instead of a woven fabric with twill weave, if desired, it is also possible to use a woven fabric with a satin weave, even fewer contact points being present prior to the sintering process. A satin weave is a special form of a twill weave.

BRIEF DESCRIPTION OF THE DRAWINGS

One embodiment of the invention will now be described with reference to the accompanying diagrammatic drawings, in which:

FIG. 1 is a top view of the woven fabric according to the invention;

FIG. 2 is a cross section through the woven fabric according to claim 1, and

FIG. 3 is a longitudinal section through the woven fabric according to FIG. 1.

FIG. 4 is a schematic of a filter employing the woven fabric of FIG. 1.

DETAILED DESCRIPTION OF THE INVENTION

The woven fabric is a 5-shaft twilled wire fabric 1 and consists of a plurality of warp wires 2 and weft wires 3. As is clear, every fifth wire is bound into the warp and weft. As is also clear, the mesh width is at least approximately equal to the diameter of each wire. Instead of wires, it is also possible to use fibres, according to the thickness and definition thereof.

Steel consisting of 20% of nickel and 25% of chromium, the remainder being iron and traces of manganese and molybdenum, can be used as a material for the wires, as is known, e.g. as material 1 4841.

High-temperature resistant sintering material 4 in powder or granular form and distributed in a binder is introduced into the woven fabric 1. This mass is spread, e.g. by means of a spatula into the meshes 5 of the woven fabric 1. Metals, ceramic materials, plastics or mixtures thereof can be used as the sintering material. However, in general, steel and steel alloys are preferably used as the sintering material. In order to produce catalytic properties, materials, e.g. steel alloys having catalytic properties, are generally used or added, e.g. platinum, rhodium, vanadium or the like. The sintering material can of course also be applied to the top and bottom of the wires 2 and 3 instead of only between the meshes 5.

It is clear from FIGS. 2 and 3 that the wires 2 and 3 are slightly curved, so that the woven fabric 1 has a thickness in excess of double the diameter of the warp and weft wires lying on top of one another. This curvature is only shown to a limited extent in the drawings, although in practice it can amount to half a diameter, giving a total thickness of the woven fabric 1 of 2.5.

The woven fabric 1 is designed in such a manner that the weave has a smooth surface on one side and a rough surface on the other.

What is claimed is:

1. A filter for removing harmful constituents from the waste gases of an internal combustion engine, said filter having a feed and a delivery end, comprising at least one layer of woven fabric of metal wires or metal fibers, sintering material in a form selected from the group consisting of powder, granules, fiber fragments and chips being introduced into said fabric sintered onto the wires or fibers, wherein the woven fabric and is in the form of a twilled wire fabric.

2. The filter according to claim 1, wherein said woven fabric is a 4-shaft or 5-shaft twilled wire fabric.

3. The filter according to claim 1 wherein the sintering material comprises a material selected from the group consisting of ceramics, plastics, metal, steel, a steel alloy, and mixtures thereof.

4. The filter according to claim 1, wherein the wires or fibers are woven in warp and weft directions and have the same diameter in said warp and weft directions.

5. The filter according to claim 1, wherein the woven fabric has a mesh width and the wires or fibers have a diameter, wherein the ratio between the mesh width and the wire or fiber diameter is about 1:1.

6. The filter according to claim 5, wherein the mesh width or the wire or fiber diameter is between 0.15 and 0.30 mm.

7. The filter according to claim 1, wherein the wires or fibers of the woven fabric have a cross sectional diameter and are curved in such a manner that the woven fabric has a thickness of approximately 2.5 times the diameter of the wires or fibers of the woven fabric.

8. The filter according to claim 1, wherein said wires or fibers are steel wires containing approximately 20% nickel and 25% chromium.

9. The filter accordingly to claim 1, wherein the woven fabric is designed with a smooth surface on one side and a rough surface on the opposite side.

10. The filter of claim 1, further including a first layer of said woven fabric having a rough surface as its exterior.

11. The filter according to claim 1, wherein several layers of said woven fabric are joined together to form one body.

12. The filter of claim 1, wherein the woven fabric is coated at the feed end with catalysts for lowering the ignition temperature of products to be burned.

13. The filter of claim 1, wherein the woven fabric is provided at the delivery end with a catalytic coating for removing carbon monoxide, carbon dioxide, harmful hydrocarbons, nitrogen oxide and other undesirable gases.

14. The filter of claim 1, wherein said twilled woven fabric is a satin weave.

15. Process for producing a filter or catalyst body for removing harmful constituents from the waste gases of an internal combustion engine, especially a diesel engine, comprising the steps of providing at least one woven fabric layer of metal wires or metal fibers, introducing a sintering material in a form selected from the group consisting of powder, granules, fiber fragments and chips into the woven fabric and then sintering together the sintering material with the wires or fibers wherein the woven fabric is in the form of a twilled wire or fiber fabric and the sintering material is introduced via a binder, after which the wires or fibers and the sintering material are sintered together.

\* \* \* \* \*